United States Patent
Gaidar et al.

(10) Patent No.: US 10,096,163 B2
(45) Date of Patent: Oct. 9, 2018

(54) HAPTIC AUGMENTED REALITY TO REDUCE NOXIOUS STIMULI

(71) Applicant: INTEL CORPORATION, Santa Clara, CA (US)

(72) Inventors: Tamara Gaidar, Haifa (IL); Yosi Govezensky, Nofit (IL); Glen J. Anderson, Beaverton, OR (US); Ido Lapidot, Haifa (IL)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 14/978,075

(22) Filed: Dec. 22, 2015

(65) Prior Publication Data
US 2017/0178407 A1 Jun. 22, 2017

(51) Int. Cl.
*G06T 19/00* (2011.01)
*G06F 3/01* (2006.01)
*G06F 1/16* (2006.01)

(52) U.S. Cl.
CPC ............ *G06T 19/006* (2013.01); *G06F 1/163* (2013.01); *G06F 3/011* (2013.01); *G06F 3/016* (2013.01)

(58) Field of Classification Search
CPC ......... G06F 3/011; G06F 3/016; G06T 19/006
See application file for complete search history.

(56) References Cited

U.S. PATENT DOCUMENTS

| 8,913,085 | B2 | 12/2014 | Anderson et al. | |
|---|---|---|---|---|
| 2014/0096590 | A1* | 4/2014 | Amin | G01N 33/0031 73/23.34 |
| 2015/0177939 | A1* | 6/2015 | Anderson | G06F 21/35 715/745 |
| 2016/0091877 | A1* | 3/2016 | Fullam | G05B 15/02 700/276 |
| 2016/0317383 | A1* | 11/2016 | Stanfield | A61H 9/0078 |
| 2016/0381415 | A1* | 12/2016 | Vijay | H04N 21/44218 725/12 |

FOREIGN PATENT DOCUMENTS

WO     2015084349 A1    6/2015

\* cited by examiner

*Primary Examiner* — Jeffrey Chow
(74) *Attorney, Agent, or Firm* — Jordan IP Law, LLC

(57) ABSTRACT

Systems, apparatuses and methods may provide for classifying a physical proximity event with respect to a wearable device based on one or more of a haptic input or a scent input. Additionally, the classified physical proximity event may be correlated with an augmented reality (AR) effect, wherein the AR effect may be initiated via the wearable device. In one example, the AR effect cancels a negative perceptual impact of the physical proximity event.

25 Claims, 5 Drawing Sheets

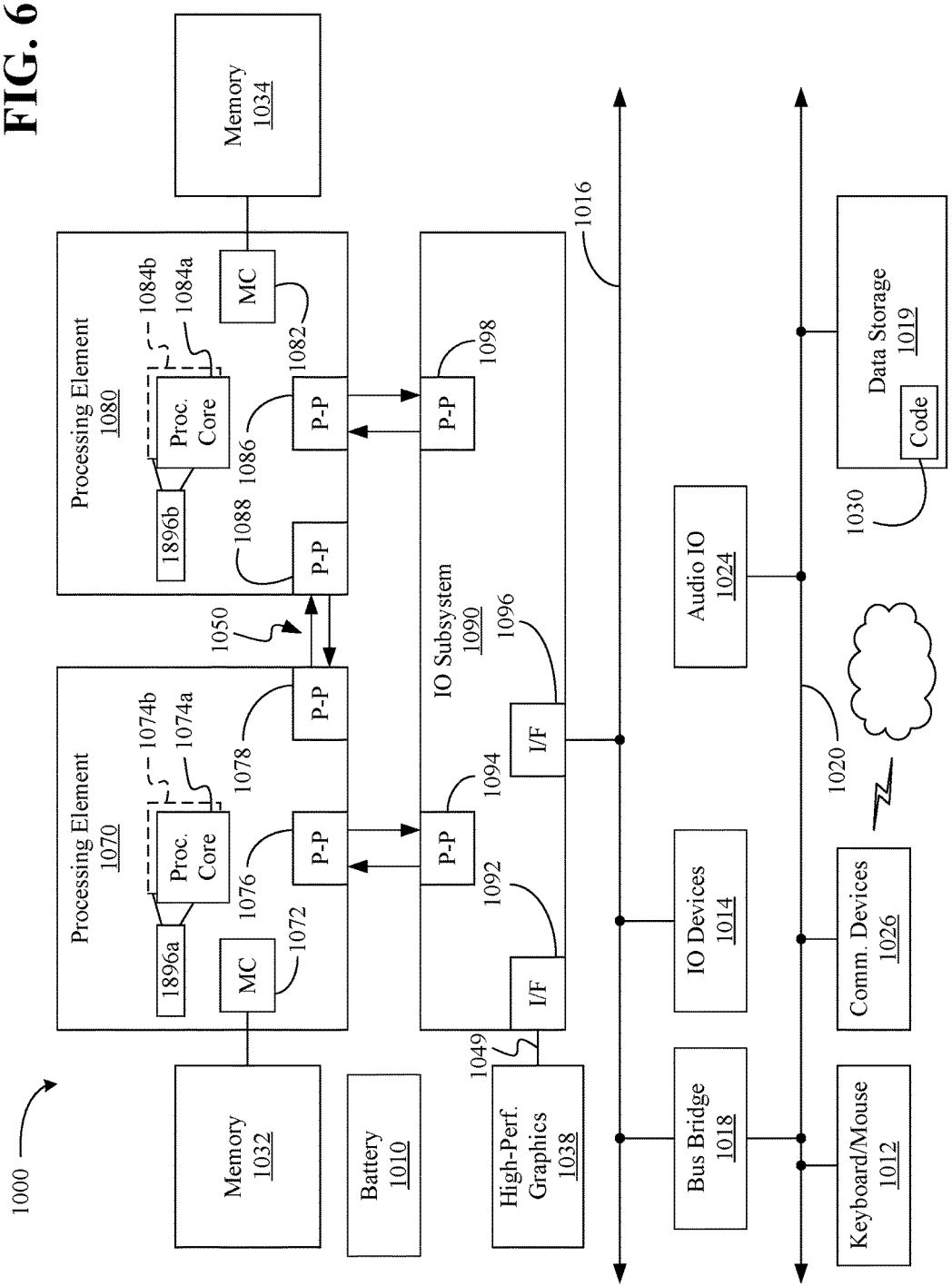

US 10,096,163 B2

HAPTIC AUGMENTED REALITY TO REDUCE NOXIOUS STIMULI

TECHNICAL FIELD

Embodiments generally relate to augmented reality. More particularly, embodiments relate to haptic augmented reality to reduce noxious stimuli.

BACKGROUND

Crowded environments may be encountered on public transportation, in elevators, at sporting events, in social settings (e.g., parties), and so forth, wherein an individual may experience undesired physical contact and/or closeness, unpleasant smells and other noxious stimuli in the crowded environment. Avoiding the crowded environment altogether may be either impractical to the individual (e.g., public transportation) or cause the individual to miss opportunities of interest (e.g., sporting events, social settings).

BRIEF DESCRIPTION OF THE DRAWINGS

The various advantages of the embodiments will become apparent to one skilled in the art by reading the following specification and appended claims, and by referencing the following drawings, in which:

FIG. 6 is a block diagram of an example of a computing system according to an embodiment.

DESCRIPTION OF EMBODIMENTS

Figure 1:
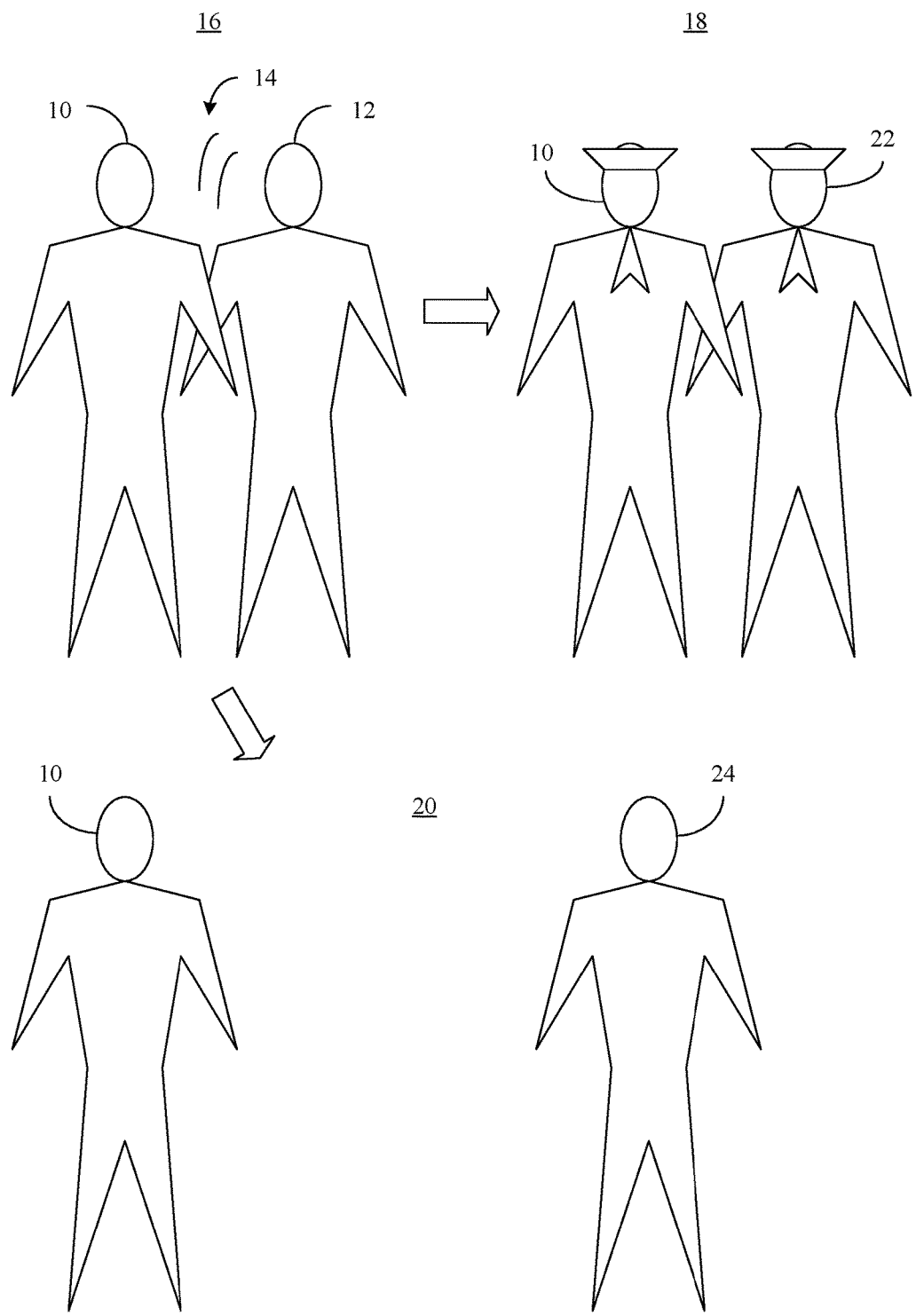
FIG. 1 is an illustration of an example of a set of augmented reality scenarios in a crowded environment according to an embodiment.

Turning now to FIG. 1, a scenario is shown in which a first individual 10 (e.g., user, person) is in a crowded environment 16 (e.g., public transportation, elevator, sporting event, social setting) in which one or more other individuals 12 are nearby or in physical contact with the first individual 10. The physical contact and/or close proximity with the one or more other individuals 12 may be considered noxious to the extent that it is undesirable from the perspective of the first individual 10 (e.g., leading to claustrophobic or other negative feelings). Moreover, an odor 14 emanating from the one or more other individuals 12 may also be considered noxious to the extent that it is unpleasant from the perspective of the first individual 10. As will be discussed in greater detail, the first individual 10 may wear a device (e.g., smart headwear, eyewear, clothing, wristwear, footwear, headset device, etc., not shown) that detects the noxious stimuli in the crowded environment 16 as one or more physical proximity events and cancels/negates/offsets the negative perceptual impact of the noxious stimuli via augmented reality (AR).

For example, the wearable device might generate an AR environment 18 that includes an immersive story in which the first individual 10 and the one or more other individuals 12 are sailors on a ship in rough sea conditions. The AR environment 18 may be generated via haptic, audio, video and/or scent components. Thus, the haptic component might include actuators placed within the clothing and/or shoes worn by the first individual 10, wherein the actuators may apply pressure to the first individual 10 in a manner that simulates the swaying of a ship and/or a virtual character 22 that touches the first individual 10 (e.g., simulating bumps from other sailors onboard). The audio component may include speakers/headsets that output the sounds of waves crashing against the hull of a ship. Additionally, the video component may include a semitransparent display (e.g., eyewear) positioned in front of the eyes of the first individual 10, wherein the display replaces the one or more other individuals 12 with the virtual character 22 or overlays the one or more other individuals 12 with sailor uniforms. The scent component might output a sea smell that masks the odor 14 emanating from the one or more other individuals 12. Other AR techniques to cancel the negative impact of the noxious stimuli may also be used.

In another example, the wearable device may generate an AR environment 20 in which a virtual character 24 is simulated to be farther away from the first individual 10 than the one or more other individuals 12 (e.g., the sources of the noxious stimuli). The AR environment 20 may also be generated via haptic, audio, video and/or scent components. For example, the haptic component may block, suppress and/or absorb (e.g., via spring-based mechanical damping technology) contact of the first individual 10 by the one or more other individuals 12. Additionally, the scent component might output a smell that masks the odor 14 emanating from the one or more other individuals 12, the video component may replace the one or more other individuals 12 with the virtual character 24, and so forth. Other AR environments and/or techniques may also be used to mask the sources of physical proximity events and/or cancel the negative impact of the noxious stimuli. Indeed, multiple individuals in a crowd (e.g., crowded elevator) or in different locations (e.g., different cities, regions, countries) may each use a wearable device to experience a virtual environment (e.g., game, story) that cancels the negative impact of noxious stimuli.

Figure 2:
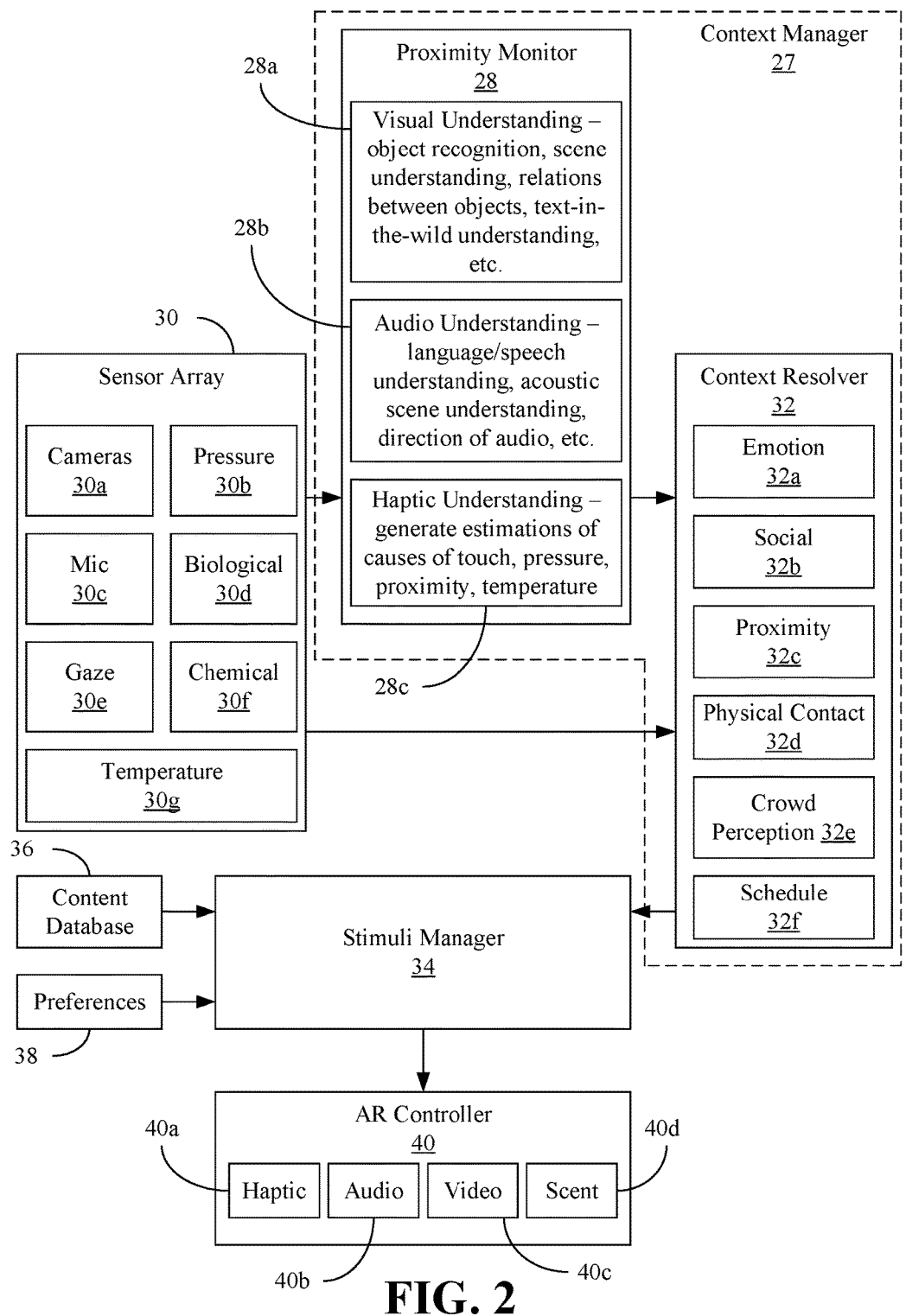
FIG. 2 is a block diagram of an example of a noxious stimuli reduction apparatus according to an embodiment.

FIG. 2 shows a noxious stimuli reduction apparatus 26. The apparatus 26 may be incorporated partly or entirely into a wearable device such as, for example, smart headwear, eyewear, clothing, wristwear, footwear, headset device, etc. The apparatus 26 may include a context manager 27 that generally classifies physical proximity events with respect to the wearable device based on input from a sensor array 30 (30a-30g). The sensor array 30 may include, for example, a camera configuration 30a, one or more pressure sensors 30b (e.g., to provide haptic input/measurements), a microphone 30c, a biological sensor 30d (e.g., to provide biological input/measurements), a gaze sensor 30e (e.g., eye tracker), one or more chemical sensors 30f (e.g., to provide scent input/measurements), a temperature sensor 30g, and so forth. Of particular note is that the context manager 27 may detect and classify physical proximity events based on haptic input from the pressure sensors 30b and/or scent input from the chemical sensors 30f.

In the illustrated example, a proximity monitor 28 (28a-28c) includes a visual understanding component 28a that conducts object recognition, scene understanding, object relationship detection, text recognition (e.g., "text-in-the-wild") and other visual activities. Additionally, an audio understanding component 28b may conduct language/speech understanding, acoustic scene understanding, audio direction detection and other audio activities. The illustrated proximity monitor 28 also includes a haptic understanding component 28c that generates estimations of causes of touch, pressure, proximity, temperature, and so forth.

The context manager 27 may also include a context resolver 32 (32a-32f) communicatively coupled to the proximity monitor 28 and/or the sensor array 30, wherein the context resolver 32 may generate classifications for the physical proximity events. In the illustrated example, the context resolver 32 includes an emotion component 32a, a social component 32b, a proximity component 32c, a physical contact component 32d, a crowd perception component 32e, a schedule component 32f, and so forth. Thus, the emotion component 32a might associate a detected physical proximity event with a particular emotion (e.g., anxiety, fear) based on, for example, a measurement from the biological sensor 30d that indicates the individual's reaction (e.g., brain computer interaction/BCI) to the physical proximity event. The social component 32b may associate a detected physical proximity event with a particular social setting (e.g., party) based on, for example, video input from the camera configuration 30a and/or audio input from the microphone 30c.

Additionally, the proximity component 32c might associate a detected physical proximity event with a personal closeness condition based on, for example, eye tracking input from the gaze sensor 30e and/or a thermal measurement from the temperature sensor 30g. Moreover, the physical contact component 32d may associate a detected physical proximity event with contact based on, for example, haptic input from the pressure sensor 30b. The crowd perception component 32e may associate a detected physical proximity event with a crowd condition based on data from the sensor array 30 and or one or more other classifications made by the other components of the context resolver 32. In addition, the schedule component 32f may associate a detected physical proximity event with a particular environment (e.g., public transportation, sporting event, social setting) based on a calendar/schedule of the individual (e.g., the individual takes the subway to work on weekday mornings). Thus, the output of the context manager 27 may be one or more classified physical proximity events (e.g., a baby crying in the airplane seat behind the user, the user is walking past a cattle feed lot, the user is standing on a crowded subway, the user is sitting on an airplane next to a person who is encroaching the user's leg space, etc.).

The illustrated apparatus 26 also includes a stimuli manager 34 communicatively coupled to the context manager 27, wherein the stimuli manager 34 may correlate classified physical proximity events with augmented reality (AR) effects. For example, the stimuli manager 34 may use the classified physical proximity events to retrieve the AR effects from a content database 36 in accordance with one or more preferences 38 (e.g., indicating the likes and/or dislikes of the user in terms of environmental stimuli as well as AR effects). Additionally, an augmented reality (AR) controller 40 (40a-40d) may be communicatively coupled to the stimuli manager 34, wherein the AR controller 40 initiates the AR effects via the wearable device. The AR effects may generally cancel any negative perceptual impact of the physical proximity events. In one example, the AR effect simulates virtual characters that touch a user of the wearable device. In another example, the AR effect simulates virtual characters that are farther away from a user of the wearable device than the sources of the physical proximity events. Other AR effects may also be used to cancel the negative impact of physical proximity events.

The AR controller 40 may therefore include a haptic component 40a (e.g., vibratory motor, actuator, solenoid, damping systems, microelectromechanical system/MEMS, piezoelectric transducer) to trigger a haptic output as the AR effect. The AR controller 40 may also include an audio component 40b (e.g., speaker, headset) to trigger an audible output and/or a video component 40c (e.g., display) to trigger a visual output as the AR effect. Moreover, a scent component 40d (e.g., atomizer, mister) may trigger a scent output as the AR effect.

Figure 3:
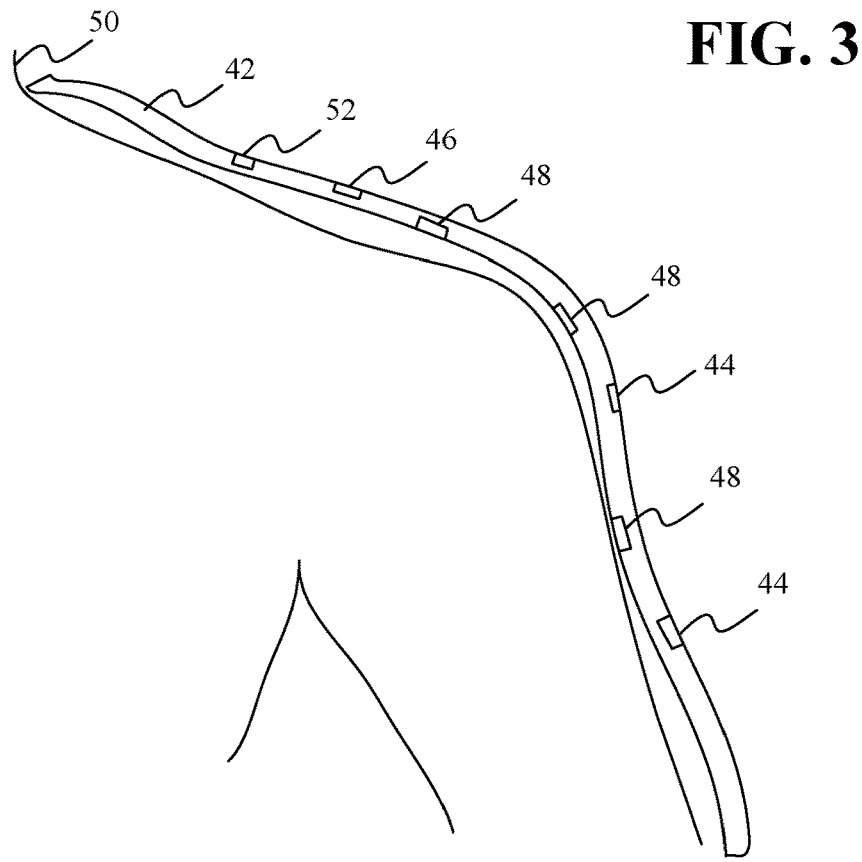
FIG. 3 an illustration of an example of a wearable device according to an embodiment.

Turning now to FIG. 3, a wearable device 42 is shown. The illustrated wearable device 42 has a housing with a wearable form factor such as, for example, clothing (e.g., shirt, blouse, coat). The wearable device 42 may include one or more sensors such as, for example, pressure sensors 44 that detect/measure haptic input from nearby objects. The wearable device 42 might also include one or more chemical sensors 46 that detect/measure scent input from nearby objects. The illustrated wearable device 42 also includes one or more haptic components 48 (e.g., vibratory motor, actuator, solenoid, damping systems, MEMS, piezoelectric transducer) to convey haptic output to a user 50 (e.g., individual) of the wearable device 42 in conjunction with an AR effect. Moreover, one or more scent components 52 may convey scent output to the user 50 of the wearable device 42 in conjunction with an AR effect.

Figure 4:
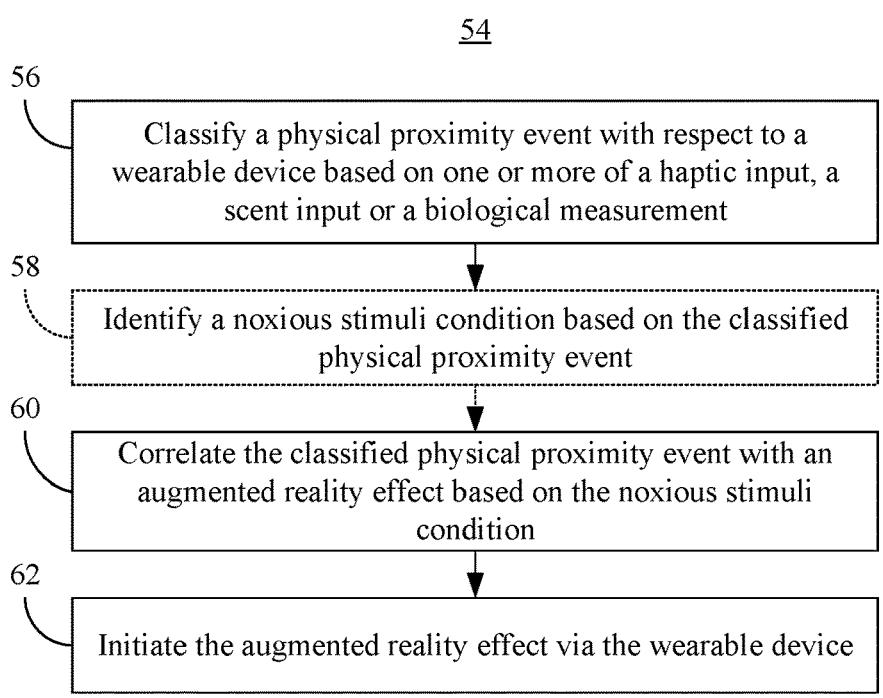
FIG. 4 is a flowchart of an example of a method of operating a noxious stimuli reduction apparatus according to an embodiment.

FIG. 4 shows a method 54 of operating a noxious stimuli reduction apparatus. The method 54 may generally be implemented in an apparatus such as, for example, the apparatus 26 (FIG. 2) and/or the wearable device 42 (FIG. 3), already discussed. More particularly, the method 54 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 54 may be written in any combination of one or more programming languages, including an object oriented programming language such as JAVA, SMALLTALK, C++ or the like and conventional procedural programming languages, such as the "C" programming language or similar programming languages.

Illustrated processing block 56 provides for classifying a physical proximity event with respect to a wearable device based on one or more of a haptic input, a scent input or a biological measurement. A noxious stimuli condition such as, for example, a crowd condition, may optionally be identified at block 58, wherein the classified physical proximity event may be correlated with an augmented reality effect at block 60 based on the noxious stimuli condition. Block 60 may include retrieving the augmented reality effect from a content database in accordance with one or more preferences. If block 58 is bypassed, block 60 may simply correlate the classified physical proximity event based solely on the classification assigned to the event. Illustrated block 62 initiates the augmented reality effect via the wearable device. Block 62 may include triggering a haptic, audible, visual and/or scent output. As already noted, the augmented reality effect may cancel a negative perceptual impact of the physical proximity event by, for example, simulating a virtual character that touches a user of the wearable device, simulating a virtual character that is farther away from a user of the wearable device than a source of the physical proximity event, and so forth.

For example, if it is determined that a baby is crying in an airplane seat behind the user, the AR effect might involve playing bird calls at a similar frequency to mask the baby crying. If, on the other hand, it is determined that the user is walking past a cattle feed lot, the AR effect might involve releasing a small amount of aloe scent from a wearable device near the collar to simulate a jungle environment. In yet another example, if it is determined that the user is standing on a crowded subway, the AR effect may involve visually and audibly adding a sailor next to the user to simulate a ship setting in rough sea conditions. Additionally, if it is determined that the user is sitting on an airplane next to a person who is encroaching the user's leg space, the AR effect might involve the haptic, visual and audible addition of a dog as a character in a game (e.g., with haptic output to simulate the dog brushing against the leg of the user). Other AR effects may also be used to mask the sources of physical proximity events.

For example, in a game context, a user might play a game (e.g., with a quest theme) with two other individuals, wherein each person is located in a different geographic location and joins the game using a wearable device implementing one or more aspects of the illustrated method 54. Thus, one of the individuals may play the game in a train, another individual might play the game in a bus and the third individual may play the game from home. Within a virtual environment generated by the wearable device(s), all of the individuals may be participating on the same team, while riding in the same elevator. Outside the virtual environment, however, each of the individuals may have different physical surroundings. Accordingly, the wearable devices may mask each of the physical surroundings differently and support the virtual version of the elevator, which is full of people.

In an athletic context, a user might train in a gym during high demand hours. In such a case, not all the facilities may be available and nearby individuals may emit different smells. Thus, a system implementing one or more aspects of the method 54 may generate a virtual environment that masks the smells and shows the user only those facilities that are currently free/available. Other facilities may be either not visible or only partially visible in the virtual environment.

With regard to restaurants and dining rooms, individuals (e.g., six people) dining together at the same table in a very busy cafeteria may be exposed to a variety of smells and noise. In the physical environment, individuals sitting far away from one another (e.g., opposite ends/sides of the table) may not be able to hear portions of the conversation. In such a case, a system implementing one or more aspects of the method 54 might mask ambient noise and enhance/amplify the conversation at the table. Thus, the virtual environment generated by the wearable system may enable the individuals sitting at the table to feel as though they are sitting in a private room of a restaurant and enjoy each other's company.

Figure 5:
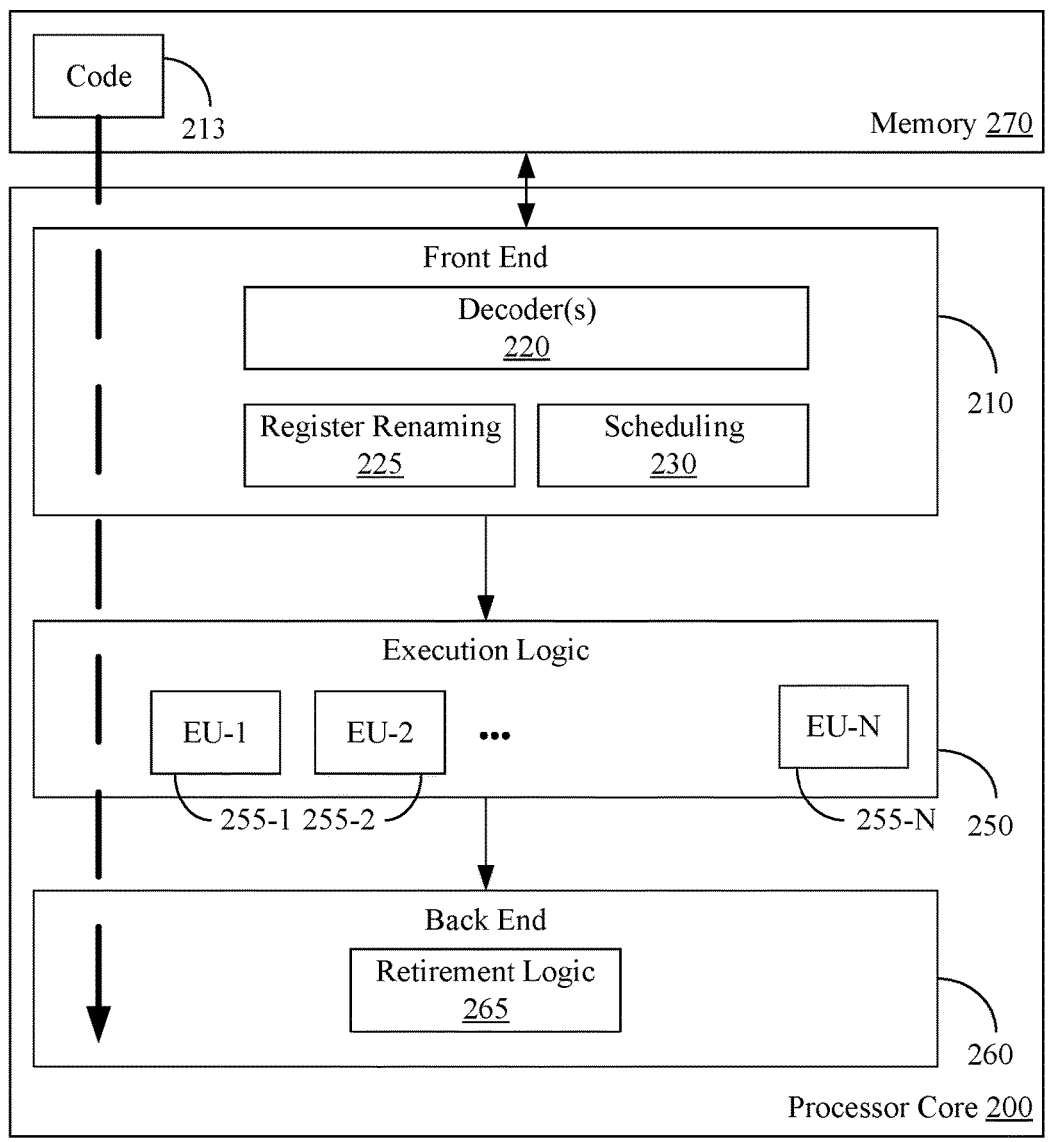
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 54 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 6, shown is a block diagram of a computing system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 54 (FIG. 4), already discussed, and may be similar to the code 213 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples

Example 1 may include a noxious stimuli reduction apparatus comprising a proximity monitor to classify a physical proximity event with respect to a wearable device based on one or more of a haptic input or a scent input, a context resolver communicatively coupled to the proximity monitor, the context resolver to correlate the classified physical proximity event with an augmented reality effect, and a augmented reality controller communicatively coupled to the context resolver, the augmented reality controller to initiate the augmented reality effect via the wearable device.

Example 2 may include the apparatus of Example 1, wherein the augmented reality effect is to cancel a negative perceptual impact of the physical proximity event.

Example 3 may include the apparatus of Example 2, wherein the augmented reality effect is to simulate a virtual character that touches a user of the wearable device.

Example 4 may include the apparatus of Example 2, wherein the augmented reality effect is to one or more of simulate a virtual character that is farther away from a user of the wearable device than a source of the physical proximity event or mask the source of the physical proximity event.

Example 5 may include the apparatus of Example 1, wherein the augmented reality controller includes one or more of a haptic component to trigger a haptic output to initiate the augmented reality effect, or a scent component to trigger a scent output to initiate the augmented reality effect.

Example 6 may include the apparatus of Example 1, wherein the context manager is to identify a crowd condition based on the classified physical proximity event, and wherein the classified physical proximity event is to be correlated with the augmented reality effect based on the crowd condition.

Example 7 may include the apparatus of Example 1, further including a content database, wherein the stimuli manager is to use the classified physical proximity event to retrieve the augmented reality effect from the content database in accordance with one or more preferences.

Example 8 may include the apparatus of any one of Examples 1 to 7, wherein the physical proximity event is to be classified further based on a biological measurement.

Example 9 may include the apparatus of any one of Examples 1 to 7, further including a sensor array to generate one or more of the haptic input or the scent input, and a housing including a wearable form factor.

Example 10 may include a method of operating a noxious stimuli reduction apparatus, comprising classifying a physical proximity event with respect to a wearable device based on one or more of a haptic input or a scent input, correlating the classified physical proximity event with an augmented reality effect, and initiating the augmented reality effect via the wearable device.

Example 11 may include the method of Example 10, wherein the augmented reality effect cancels a negative perceptual impact of the physical proximity event.

Example 12 may include the method of Example 11, wherein the augmented reality effect simulates a virtual character that touches a user of the wearable device.

Example 13 may include the method of Example 11, wherein the augmented reality effect one or more of simulates a virtual character that is farther away from a user of the wearable device than a source of the physical proximity event or masks the source of the physical proximity event.

Example 14 may include the method of Example 10, wherein initiating the augmented reality effect includes triggering one or more of a haptic output or a scent output from the wearable device.

Example 15 may include the method of Example 10, further including identifying a crowd condition based on the classified physical proximity event, wherein the classified physical proximity event is correlated with the augmented reality effect based on the crowd condition.

Example 16 may include the method of Example 10, wherein correlating the classified physical proximity event with the augmented reality effect includes using the classified physical proximity event to retrieve the augmented reality effect from a content database in accordance with one or more preferences.

Example 17 may include the method of any one of Examples 10 to 16, wherein the physical proximity event is classified further based on a biological measurement.

Example 18 may include may include at least one computer readable storage medium comprising a set of instructions, which when executed by a wearable device, cause the wearable device to classify a physical proximity event with respect to the wearable device based on one or more of a haptic input or a scene input, correlate the classified physical proximity event with an augmented reality effect, and initiate the augmented reality effect via the wearable device.

Example 19 may include the at least one computer readable storage medium of Example 18, wherein the augmented reality effect is to cancel a negative perceptual impact of the physical proximity event.

Example 20 may include the at least one computer readable storage medium of Example 19, wherein the augmented reality effect is to simulate a virtual character that touches a user of the wearable device.

Example 21 may include the at least one computer readable storage medium of Example 19, wherein the augmented reality effect is to one or more of simulate a virtual character that is farther away from a user of the wearable device than a source of the physical proximity event or mask the source of the physical proximity event.

Example 22 may include the at least one computer readable storage medium of Example 18, wherein the instructions, when executed, cause the wearable device to trigger one or more of a haptic output or a scent output from the wearable device to initiate the augmented reality effect.

Example 23 may include the at least one computer readable storage medium of Example 18, wherein the instructions, when executed, cause the wearable device to identify a crowd condition based on the classified physical proximity event, and wherein the classified physical proximity event is to be correlated with the augmented reality effect based on the crowd condition.

Example 24 may include the at least one computer readable storage medium of Example 18, wherein the instructions, when executed, cause the wearable device to use the classified physical proximity event to retrieve the augmented reality effect from a content database in accordance with one or more preferences.

Example 25 may include the at least one computer readable storage medium of any one of Examples 18 to 24, wherein the physical proximity event is to be classified further based on a biological measurement.

Example 26 may include a noxious stimuli reduction apparatus comprising means for classifying a physical proximity event with respect to a wearable device based on one or more of a haptic input or a scent input, means for correlating the classified physical proximity event with an augmented reality effect, and means for initiating the augmented reality effect via the wearable device.

Example 27 may include the apparatus of Example 26, wherein the augmented reality effect is to cancel a negative perceptual impact of the physical proximity event.

Example 28 may include the apparatus of Example 27, wherein the augmented reality effect is to simulate a virtual character that touches a user of the wearable device.

Example 29 may include the apparatus of Example 27, wherein the augmented reality effect is to one or more of simulate a virtual character that is farther away from a user of the wearable device than a source of the physical proximity event or mask the source of the physical proximity event Example 30 may include the apparatus of Example 26, wherein the means for initiating the augmented reality effect includes means for triggering one or more of a haptic output or a scent output from the wearable device.

Example 31 may include the apparatus of Example 26, further including means for identifying a crowd condition based on the classified physical proximity event, wherein the classified physical proximity event is correlated with the augmented reality effect based on the crowd condition.

Example 32 may include the apparatus of Example 26, wherein the means for correlating the classified physical proximity event with the augmented reality effect includes means for using the classified physical proximity event to retrieve the augmented reality effect from a content database in accordance with one or more preferences.

Example 33 may include the apparatus of any one of Examples 26 to 32, wherein the physical proximity event is to be classified further based on a biological measurement.

Thus, techniques described herein may use haptic/tactile and scent AR to minimize the perceptions of crowding. A wearable device/system may present a pleasant AR environment based on user preferences and sensor array data. For example, contact with a nearby person may be replaced by something that is more pleasant such as, for example, a character in a game being played. The tactile feeling from the other person may be augmented or blocked by haptic components in a wearable device that fit the game or story. Moreover, nearby people may be made to appear farther away to reduced crowded feelings. Such a solution may entice more individuals to use public transportation and/or attend other events with many people. Additionally, built-in safeguards may deactivate the AR effects depending on the circumstances (e.g., when the plane is preparing to land).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
a context manager to classify a physical proximity event with respect to a wearable device based on one or more of a haptic input or a scent input;
a stimuli manager communicatively coupled to the context manager, the stimuli manager to correlate the classified physical proximity event with an augmented reality effect, wherein the augmented reality effect is to be identified as being associated with an offset of a perceptual impact of the physical proximity event; and
an augmented reality controller communicatively coupled to the stimuli manager, the augmented reality controller to initiate the augmented reality effect via the wearable device so that the perceptual impact is to be offset by the augmented reality effect.

2. The apparatus of claim 1, wherein the augmented reality effect is to cancel the perceptual impact of the physical proximity event.

3. The apparatus of claim 2, wherein:
the physical proximity event is to be classified by the context manager as being associated with physical contact; and
the augmented reality effect is to simulate a virtual character that touches a user of the wearable device.

4. The apparatus of claim 2, wherein the augmented reality effect is to one or more of simulate a virtual character that is farther away from a user of the wearable device than a source of the physical proximity event or mask the source of the physical proximity event.

5. The apparatus of claim 1, wherein the context manager is to one or more of classify the physical proximity event as being associated with physical contact, or classify the physical proximity event as being associated with a scent; and
wherein the augmented reality controller includes one or more of:
a haptic component to trigger a haptic output to initiate the augmented reality effect when the classified physical proximity event is associated with the physical contact; or
a scent component to trigger a scent output to initiate the augmented reality effect when the classified physical proximity event is associated with the scent.

6. The apparatus of claim 1, wherein the context manager is to identify a crowd condition based on the classified physical proximity event, and wherein the classified physical proximity event is to be correlated with the augmented reality effect based on the crowd condition.

7. The apparatus of claim 1, further including a content database, wherein the stimuli manager is to use the classified physical proximity event to retrieve the augmented reality effect from the content database in accordance with one or more preferences.

8. The apparatus of claim 1, wherein the physical proximity event is to be classified further based on a biological measurement.

9. The apparatus of claim 1, further including:
a sensor array to generate one or more of the haptic input or the scent input; and
a housing including a wearable form factor.

10. A method comprising:
classifying a physical proximity event with respect to a wearable device based on one or more of a haptic input or a scent input;
correlating the classified physical proximity event with an augmented reality effect, wherein the augmented reality effect is identified as being associated with an offset of a perceptual impact of the physical proximity event; and initiating the augmented reality effect via the wearable device so that the perceptual impact is offset by the augmented reality effect.

11. The method of claim 10, wherein the augmented reality effect cancels the perceptual impact of the physical proximity event.

12. The method of claim 11, wherein:
classifying the physical proximity event includes classifying the physical proximity event as being associated with physical contact; and
the augmented reality effect simulates a virtual character that touches a user of the wearable device.

13. The method of claim 11, wherein the augmented reality effect one or more of simulates a virtual character that is farther away from a user of the wearable device than a source of the physical proximity event or masks the source of the physical proximity event.

14. The method of claim 10, wherein:
classifying the physical proximity event includes one or more of classifying the physical proximity event as being associated with physical contact, or classifying the physical proximity event as being associated with a scent; and
the initiating the augmented reality effect includes triggering one or more of a haptic output from the wearable device when the classified physical proximity event is associated with the physical contact, or a scent output from the wearable device when the classified physical proximity event is associated with the scent.

15. The method of claim 10, further including identifying a crowd condition based on the classified physical proximity event, wherein the classified physical proximity event is correlated with the augmented reality effect based on the crowd condition.

16. The method of claim 10, wherein correlating the classified physical proximity event with the augmented reality effect includes using the classified physical proximity event to retrieve the augmented reality effect from a content database in accordance with one or more preferences.

17. The method of claim 10, wherein the physical proximity event is classified further based on a biological measurement.

18. At least one non-transitory computer readable storage medium comprising a set of instructions, which when executed by a wearable device, cause the wearable device to:
classify a physical proximity event with respect to the wearable device based on one or more of a haptic input or a scent input;
correlate the classified physical proximity event with an augmented reality effect, wherein the augmented reality effect is to be identified as being associated with an offset of a perceptual impact of the physical proximity event; and
initiate the augmented reality effect via the wearable device so that the perceptual impact is to be offset by the augmented reality effect.

19. The at least one non-transitory computer readable storage medium of claim 18, wherein the augmented reality effect is to cancel the perceptual impact of the physical proximity event.

20. The at least one non-transitory computer readable storage medium of claim 19, wherein:
the physical proximity event is to be classified as being associated with physical contact; and
the augmented reality effect is to simulate a virtual character that touches a user of the wearable device.

21. The at least one non-transitory computer readable storage medium of claim 19, wherein the augmented reality effect is to one or more of simulate a virtual character that is farther away from a user of the wearable device than a source of the physical proximity event or mask the source of the physical proximity event.

22. The at least one non-transitory computer readable storage medium of claim 18, wherein classify the physical proximity event is to include one or more of classify the physical proximity event as being associated with physical contact, or classify the physical proximity event as being associated with a scent;
wherein the instructions, when executed, cause the wearable device to trigger one or more of a haptic output from the wearable device to initiate the augmented reality effect when the physical proximity event is associated with the physical contact, or a scent output from the wearable device to initiate the augmented reality effect when the physical proximity event as being associated with the scent.

23. The at least one non-transitory computer readable storage medium of claim 18, wherein the instructions, when executed, cause the wearable device to identify a crowd condition based on the classified physical proximity event, and wherein the classified physical proximity event is to be correlated with the augmented reality effect based on the crowd condition.

24. The at least one non-transitory computer readable storage medium of claim 18, wherein the instructions, when executed, cause the wearable device to use the classified physical proximity event to retrieve the augmented reality effect from a content database in accordance with one or more preferences.

25. The at least one non-transitory computer readable storage medium of claim 18, wherein the physical proximity event is to be classified further based on a biological measurement.

* * * * *